United States Patent [19]
Muraoka

[11] Patent Number: 5,223,916
[45] Date of Patent: Jun. 29, 1993

[54] DEVICE FOR DISCRIMINATING VARIATIONS IN THE MAGNITUDES OF COLOR DIFFERENCES

[76] Inventor: Tetsuya Muraoka, 693 Noriedacho, Hamamatsu-shi, Shizuoka-ken, Japan

[21] Appl. No.: 765,383

[22] Filed: Sep. 25, 1991

[30] Foreign Application Priority Data

Dec. 28, 1990 [JP] Japan .................. 2-415399

[51] Int. Cl.$^5$ .................. G01J 3/51
[52] U.S. Cl. .................. 356/402
[58] Field of Search .................. 356/402

[56] References Cited

U.S. PATENT DOCUMENTS 5,089,976 2/1992 Cate et al. .................. 356/402 X

Primary Examiner—Vincent P. McGraw
Attorney, Agent, or Firm—Spencer, Frank & Schneider

[57] ABSTRACT

A device for discriminating variations in the magnitudes of color differences. It is composed of an optoelectric conversion device consisting of a CCD facing a sample at a right angle with respect to the optical axis of the CCD. The can be moved by stepping motors along the X and Y coodinates on the plane on which the sample is mounted. The stepping motors are controlled by an 8-bit personal computer. Rods are used to move the CCD. The variations in the magnitudes of the color differences are sensed at certain X and Y positions in finite time intervals. A Xenon lamp is used as a light source to illuminate the sample. The system of discriminating variations of the magnitudes of color differences consists of a CCD image, a 16-bit personal computer, an AD converter, and a CRT. The discrimination is carried out by using subjective equivalent hue data and functional data on the personal computer. The former is given by the upper and lower limits to the subjective equivalent hue with respect to the standard stimuli at a certain wavelength in the visible range to standard eyes having a specific color sensation. The latter is obtained from the spectral response of the optoelectric conversion device, i.e., the CCD imager.

8 Claims, 7 Drawing Sheets

DEVICE FOR DISCRIMINATING VARIATIONS IN THE MAGNITUDES OF COLOR DIFFERENCES

BACKGROUND OF THE INVENTION

The present invention relates to a discrimination device to discriminate variations in the magnitudes of colors so that the variations of magnitudes of color differences, if any, on the painted surface of an object or on the colored surface of a dyed clothe can be perceived by employing the same basis as that used by a human being to discriminate a certain type of color difference.

Variations in the magnitudes of color differences found in paintings, dyes and printing have discriminated by the subjective decision made by an observer in charge of such work.

Even if variations are found in wavelength from the designated color, no variations of magnitudes of color differences are specified to be detected by the customer when the variations are within a certain range wherein no variations of magnitudes of color differences are sensationally perceived. Unless the variations of magnitudes of color differences can be perceived by an observer with normal sensation, they are not specified to be detected even if they can be measured.

This type of decision has been made by the worker who is skillful due to his many experiences.

Devices and systems which automatically acquire continuous data for making a decision regarding colors have been proposed prior to the present invention, and they include Japanese Laid-Open Patent Applications No. Hei 1-141326 entitled Colorimetric Method, No. Hei 2-51032 entitled Color Shade Evaluating Method for Color Molded Product, Hei 2-114134 entitled Color Identification Device, and Hei 2-73122 entitled Continuous Colorimetry Instrument.

Variations in the magnitude of colors have not been considered in the detection devices described heretofore. Although data has been obtained for the magnitudes of colors, the variations of magnitudes of color differences cannot be discriminated by the obtained data.

The ability to discriminate between the variations in the magnitudes of color differences, which means the range in which the variations of magnitudes of color differences can be discriminated, depends on the characteristics of the eyes of the person making the discrimination. The ability to discriminate the variations of magnitudes of color differences by a person having blue eyes has been compared with that of a person having dark eyes on the basis of the fact that the ability to discriminate the variations of magnitudes of color differences depends on the color of the eyes of the observer.

Data which indicates the capability of discriminating the hue by a person having dark eyes has been obtained.

SUMMARY OF THE INVENTION

An objective of the invention is to provide an automatic device for discriminating variations in the magnitudes of color differences so that variations in the magnitude of the color difference of a specified color can be discriminated based on the ability of a specific person to discriminate the hue.

Another objective of the invention is to provide an automatic device for discriminating between the variations in the magnitudes of an arbitrary color in the entire visible range of colors.

The automatic device for discriminating between variations in the magnitudes of color differences in accordance with the present invention provides a light source to illuminate the object to be discriminated as a sample during testing, and an optoelectric conversion device to accept the light reflected from the object being illuminated by the light source.

The optoelectric conversion device can be moved by using supporting means with respect to the sample.

Subjective equivalent hue data is defined by its upper and lower limiting wavelengths $Y_1 = f_{Y_1}(X)$ and $Y_2 = f_{Y_2}(X)$ in terms of the standard stimuli at wavelength X to the standard eye with a specific color sensation in the visible range of colors.

Functional data is defined in terms of the spectral response of the optoelectric conversion device, $B = B(X)$, as $$B_1 = B[f_{Y_1}(X)] = f_{B_1}(X)$$

$$B_2 = B[f_{Y_2}(X)] = f_{B_2}(X).$$

Both subjective equivalent hue data and functional data have been input to the processor consisting of a CPU so that the CPU calculates $B_1$ and $B_2$ when wavelength X is being input, where wavelength X represents a color which can be obtained from an ideal object being illuminated by a light source for use in the testing of an object to be discriminated. The CPU compares, with $B_1$ and $B_2$, an output $B_m$ of the optoelectric conversion device when the object is illuminated over an arbitrary area by the light source during testing.

Dark eyes have been used as a standard having a specific color sensation. Subjective equivalent hue data consisting of a wavelength $Y_1 = Y(X)$ which indicates the upper limit to the subjective equivalent hue and wavelength $Y_2 = Y(X)$ which indicates the lower limit to the subjective equivalent hue was obtained from a healthy subject with dark eyes. The data corresponded to the standard stimuli at wavelength X in the visible range of colors to the dark eyes during an experiment carried out by the inventor, and the data obtained was statistically processed by him.

The automatic device for discriminating variations in the magnitudes of color differences is such a device that no variations of the magnitudes of the color differences are recognized or perceived when the output $B_m$ satisfies the inequality $B_1 < B_m < B_2$.

A Xenon lamp can be used as a light source to illuminate the object to be discriminated during testing.

The optoelectric conversion device consists of a set of CCD's and a signal processing circuit which processes the outputs of the CCD's, and is controlled by the CPU.

Supporting means which supports the optoelectric conversion device with respect to the sample can move the optoelectric conversion device on a plane which is in parallel with the plane whereon the sample is mounted.

The automatic device for discriminating variations in the magnitudes of color differences comprises an optoelectric conversion device which consists of two or more optoelectric elements, each having a different spectral response, so that the automatic device can selectively evaluate the output of each optoelectric element.

The light source to illuminate the object to be discriminated during the testing is such that the wavelength range of the light from the light source covers the spectral responses of the respective optoelectric elements in the optoelectric conversion device.

The optoelectric conversion device comprises of at least first and second optoelectric elements corresponding to the primary of colors, and a signal processing circuit which to processes the outputs of these optoelectric elements. The optoelectric conversion device is controlled by a CPU.

Supporting means are provided to support the optoelectric conversion device with respect to the sample.

The processor consisting of a CPU stores subjective equivalent hue date which consists of upper and lower limits to the subjective equivalent hue, which are respectively given by $Y_1 = f_{Y1}(X)$ and $Y_2 = f_{Y2}(X)$ and, corresponding to the standard stimuli, at wavelength X in the visible range of colors, to the standard eyes with a specific color sensation, functional data obtained from the spectral responses of the first and second optoelectric elements, which are respectively given by $B = B(X)$ and $G = G(X)$, and wavelength Xs which is defined as the boundary in wavelength between the spectral responses of the first and second optoelectric elements, provided that the functional data is represented as $$B_1 = B[f_{Y1}(X)] = f_{B1}(X)$$

$$B_2 = B[f_{Y2}(X)] = f_{B2}(X)$$

$$G_1 = G[f_{Y1}(X)] = f_{G1}(X)$$

and $$G_2 = G[f_{Y2}(X)] = f_{G2}(X).$$

The CPU first inputs wavelength X representing the color resulting from the ideal object to be discriminated when the object is illuminated by the light source for use in testing, and then compares X with Xs. For $X < X_s$, the CPU calculates $B_1$ and $B_2$. The CPU then inputs output $B_m$ of the first optoelectric element, whose amplitude is proportional to the spectral response of the first optoelectric element in the optoelectric conversion device at an arbitrary of area, and the compares $B_1$ and $B_2$ with $B_m$. For $B_1 < B_m < B_2$, the CPU recognizes that no variations in the magnitudes of the colors have been perceived. For $X \geq X_s$, the CPU calculates $G_1$ and $G_2$. The CPU inputs output $G_m$ of the second optoelectric element in the optoelectric conversion device at an arbitrary area, and the compares $G_1$ and $G_2$ with $G_m$. For $G_1 < G_m < G_2$, the CPU recognizes that no variations in the magnitudes of the colors have been perceived. Thereafter, the CPU displays the results of the above discrimination.

DESCRIPTION OF THE PREFERRED EMBODIMENT

Figure 1:
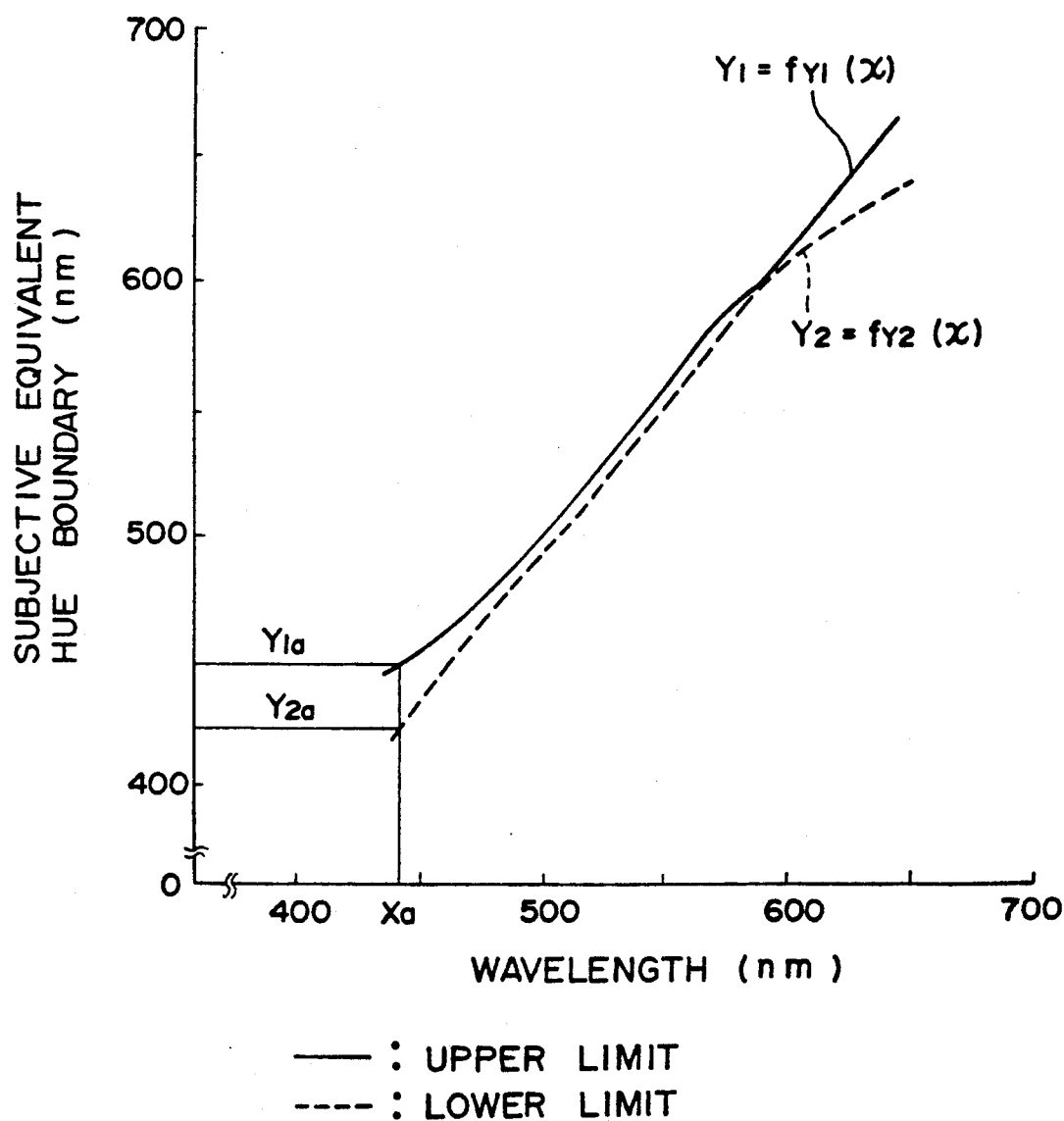
FIG. 1 shows the limits in wavelengths to the subjective equivalent hue according to the present invention.

The present invention will be explained hereafter referring to the drawings.

The following describe a system for automatically discriminating variations in the magnitudes of color differences wherein the color difference threshold is considered with respect to the eyes, and the automatic device discriminating variations in the magnitudes of color differences.

The subjective boundary wavelengths of hue were obtained for purple, blue, green, yellow, orange, and red by the constant method applied to dark eyes. Table 1 compares the subjective boundary wavelengths perceived by dark eyes with those perceived by blue eyes, where the latter has been published in the literature. Blue eye seem to be sensitive to blue and purple, and they seem to be able to perceive color differences in the short wavelength range at a higher sensitivity than dark eyes.

TABLE 1

Subjective boundary wavelengths perceived by blue and dark eyes (in nanometers)
Boundary Wavelength between

| | red & orange | orange & yellow | yellow & green | green & blue | blue & purple |
|---|---|---|---|---|---|
| BLUE | 611 | 591 | 567 | 495 | 442 |
| DARK | 618 | 592 | 574 | 508 | 453 |

The wavelengths at the center of the respective colors, which have been perceived by dark eyes in the subjective equivalent hue, are 430 nm in purple, 480 nm in blue, 535 nm in green, 580 nm in yellow, 600 nm in orange, and 635 nm in red.

The upper and lower limits to the subjective equivalent hue were measured by the constant method with respect to the standard stimuli. FIG. 1 shows the averages and 95% confidence levels of the measured upper and lower limits to the subjective equivalent hue boundaries at the respective specific wavelengths.

The upper limit to the subjective equivalent hue for an boundaries for the same subjective color whose specific wavelength is a little shorter than that of orange fall into the same orange color zone around 600 nm because the wavelength thresholds for both colors are within the passband range of an interference filter having a passband range of less than 10 nm. A series of interference filters of this type are arranged in 10 nm spans. The width of spans between the upper limit to the subjective equivalent hue boundaries for a certain color and the lower limit to the subjective equivalent hue boundaries for the same subjective color whose specific wavelengths is a little shorter than that can be defined as the width of a subjective color at a specific wavelength. The width of this type of filter was widest in purple and it became narrower as the color goes from purple to orange through yellow. Thereafter, the width of this type of filter became wider again as the color goes from orange to red.

The interpolation method is then applied to determine the upper and lower limits to the subjective equivalent hue boundary at a specific wavelength of color so that a regression function can be generated to minimize the standard deviation in interpolation.

Expression (1) gives the upper limit $Y_1$ (nm) to the subjective equivalent hue boundary as $$Y_1 = 2.18 \times 10^{-6} X^3 - 2.36 \times 10^{-3} X^2 - 1.63 X \qquad (1).$$

Expression (2) gives the lower limit $Y_2$ (nm) to the subjective equivalent hue boundary as $$Y_2 = 1.95 \times 10^{-4} X^2 + 0.88 X \qquad (2).$$

Where, $Y_1$ and $Y_2$ are valid for wavelengths in the 410 to 670 nm range.

The width of the span at a specific wavelength in expressions (1) and (2) provides a difference threshold for the subjective equivalent hue. This kind of data entered into the system for automatically discriminating variations in the magnitudes of color differences is used as the standard for the color sensation of dark eyes in the CCD imager.

Data given in accordance with expression $Y_1 = f_{Y1}(X)$ and $Y_2 = f_{Y2}(X)$ for the subjective equivalent hue will be explained hereafter referring to FIG. 1.

Assume that wavelength $X_a$ lies in the 410 to 670 nm range. We define wavelength $Y_1$ as $Y_1 = f_{Y1}(X_a)$ and the wavelength $Y_2$ as $Y_2 = f_{Y2}(X_a)$. Thus, we can find that the unequality $Y_1 > X_a > Y_2$ is valid for wavelengths in the 410 to 670 nm range. Any observer having dark eyes cannot discriminate the colors at wavelengths $X_a$ or at a wavelength which is longer than $X_a$ and shorter than $Y_1$. Any observer having dark eyes cannot discriminate the colors at wavelength $X_a$ or at a wavelength which is shorter than $X_a$ and longer than $Y_2$.

The present invention is to utilize the above principle for the discrimination of variations in the magnitudes of color differences.

Figure 5A:
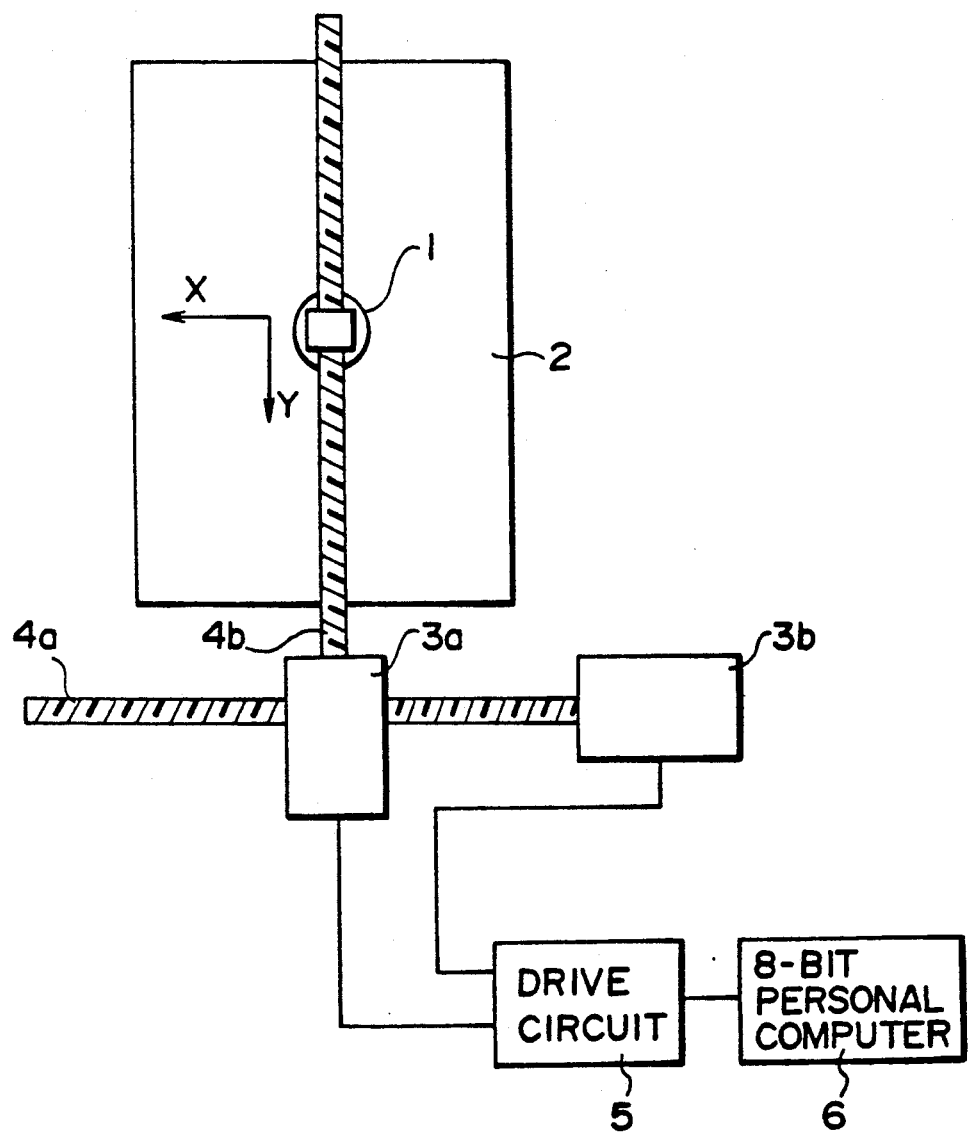
FIG. 5(a) shows a plan view of an embodiment of the moving structure of a CCD used in the discriminating device according to the present invention.
Figure 6:
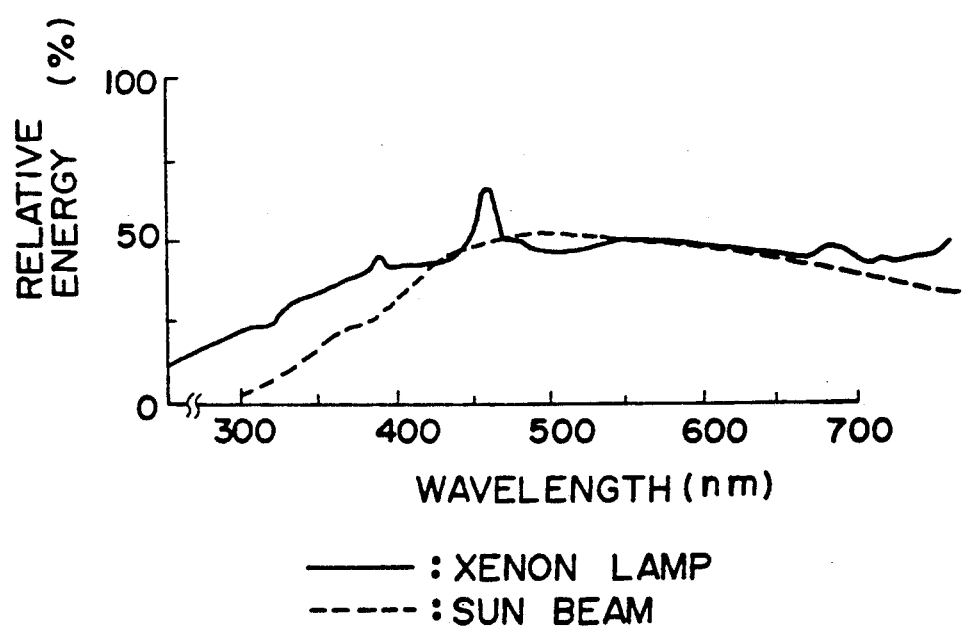
FIG. 6 shows the spectral response of the Xenon lamps used in the device of the present invention.

FIG. 5(a) shows a plan view of an embodiment of a moving structure of a CCD imager used in the discriminating device according to the present invention. CCD1 facing sample 2 at a right angle with respect to the optical axis can be moved by stepping motors 3a and 3b along the X and Y coordinates on the plane whereon sample 2 is mounted. Stepping motors 3a and 3b are controlled by an 8-bit personal computer. Rods 4a and 4b are used to move the CCD1. Variations in the magnitudes of color differences are sensed at certain X and Y positions in finite time intervals. A Xenon lamp is used as a light source to illuminate the sample since the Xenon lamp generates light whose spectral energy resembles that of a sun beam in the visible wavelength range. FIG. 6 shows the spectral energy of light from a Xenon lamp.

Figure 5B:
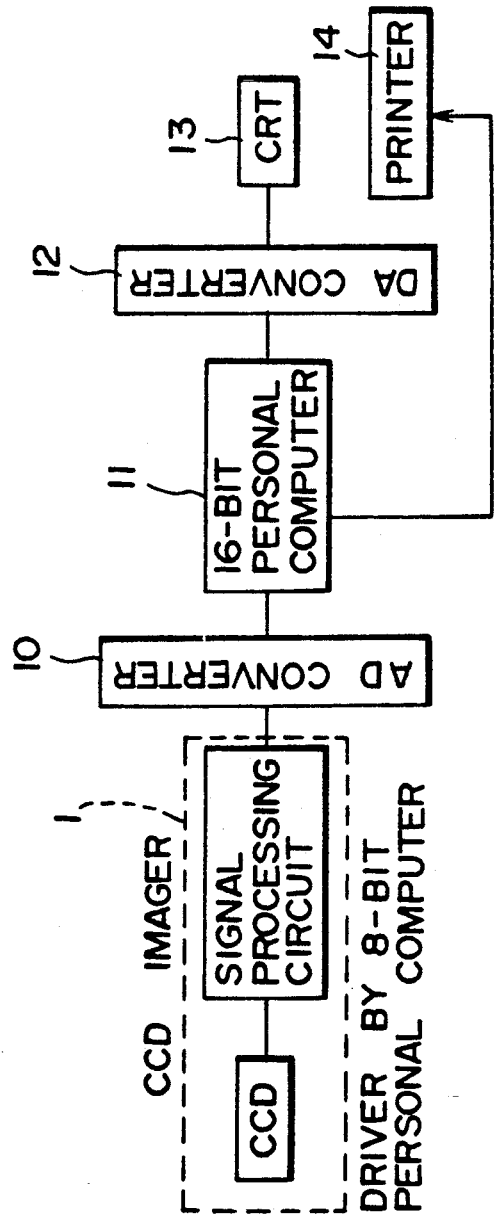
FIG. 5(b) shows a circuit diagram of an automatic device for discriminating variations in the magnitudes of color differences.

FIG. 5(b) shows the circuit diagram of an automatic device for discriminating variations in the magnitudes of color differences, i.e., in painting or dyeing. The CCD image 1 driven from an 8-bit personal computer is connected to a 16-bit personal computer through an analog-to-digital converter 10, and the 16-bit personal computer is connected to a CRT 13 through a digital-to-analog converter 12. Data acquired by the CCD imager 1 in FIG. 5(a) is sequentially compared with numerical values calculated by expressions (3) through (8) which have been programmed within the 16-bit personal computer 11. The resulting variations in the magnitudes of the color differences are respectively output on the CRT 13 and a printer 14.

Figure 2:
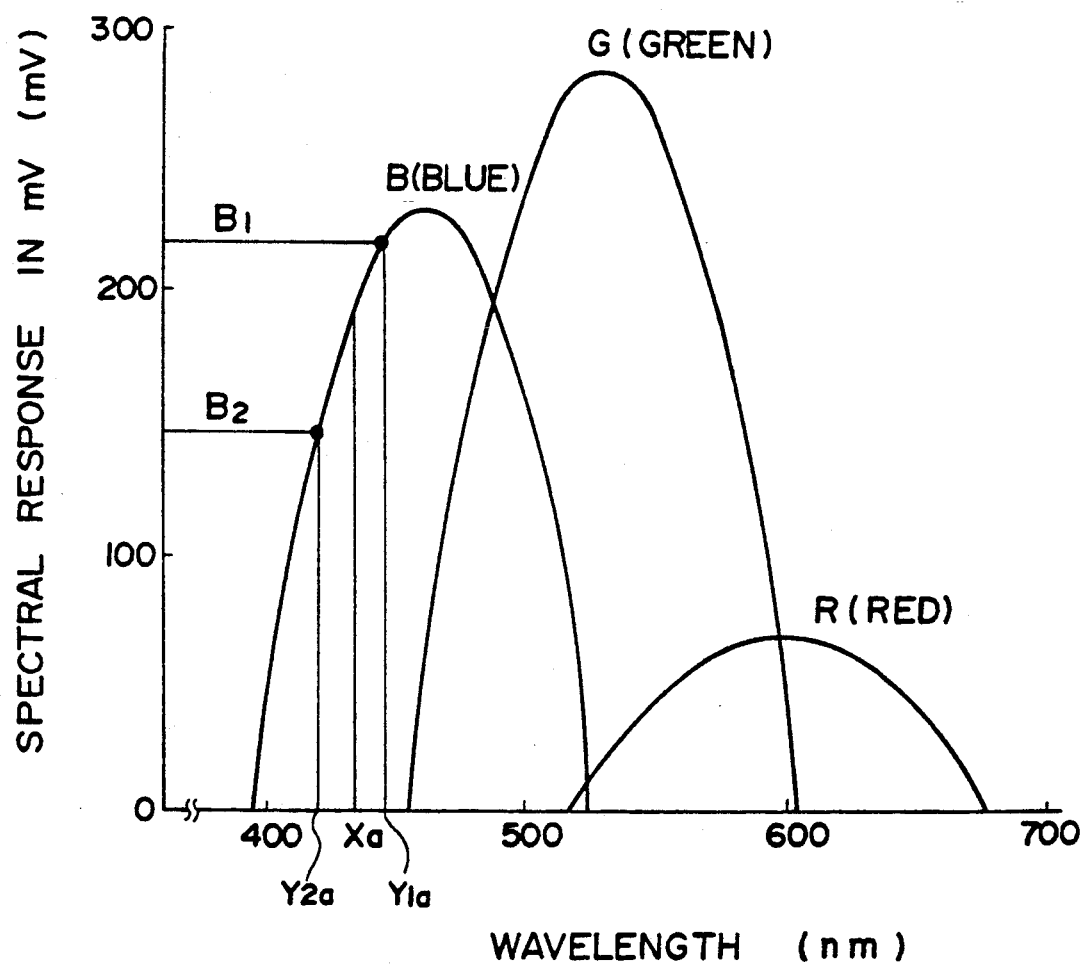
FIG. 2 shows the red, green, and blue channel output voltages of the CCD imager in terms of the wavelength according to the present invention.

The CCD imager 1 consists of 510 (horizontal) $\times$ 492 (vertical picture element cells, having a horizontal resolution of 330 lines, and is of the inter-line transfer type. The CCD imager provides a green filter and a red-blue stripe filter in its optical system. The CCD imager also provides a signal processing circuit. FIG. 2 shows the red (R), green (G), and blue (B) color channel responses of CCD imager. The responses were measured by using an interference filter.

Figure 3:
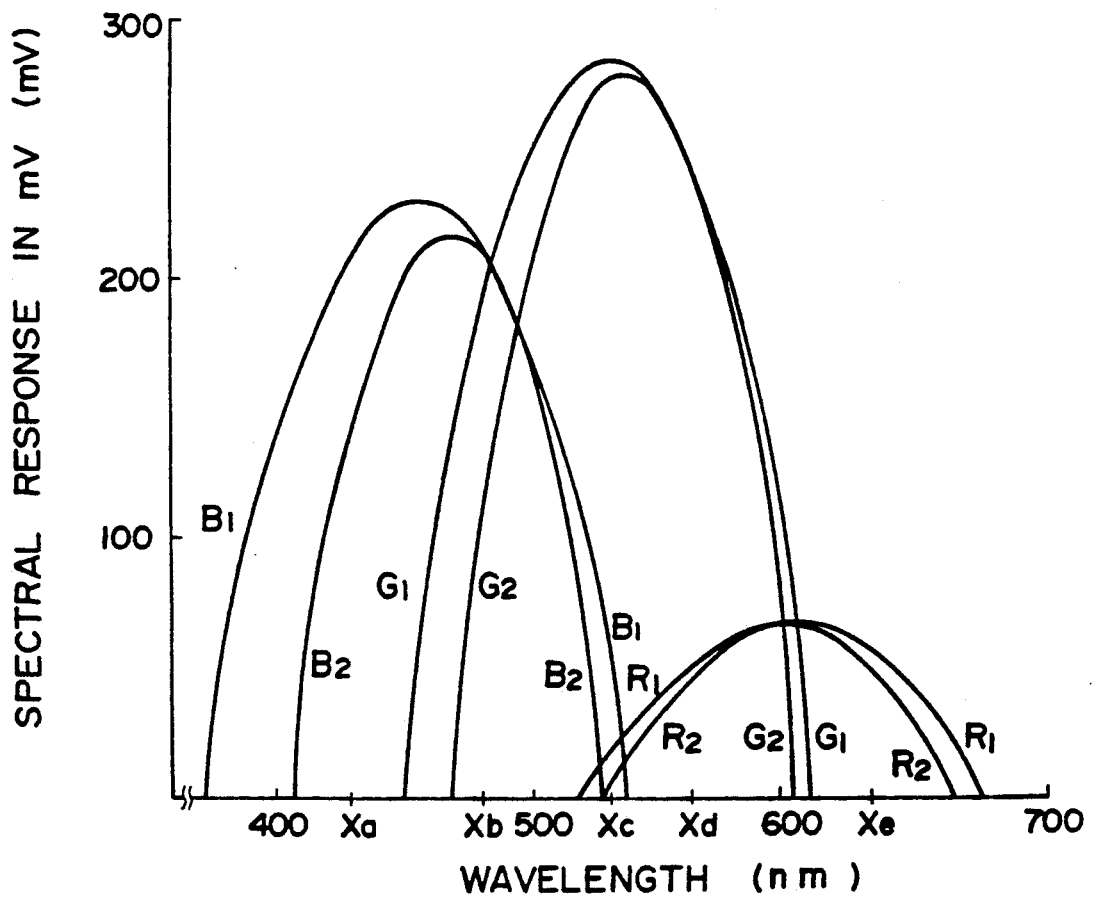
FIG. 3 shows the red, green, and blue channel output voltages of the CCD imager in terms of the wavelength (Difference threshold considered) according to the present invention.

Expressions (1) and (2) have been applied to the color channel responses of FIG. 2 so that the CCD imager provides the color sensation of the dark eyes. FIG. 3 shows the red (R), green (G), and blue (B) color channel responses obtained in accordance with the upper and lower limits to the subjective equivalent hue boundaries at the respective wavelengths. The responses of the CCD imager in FIG. 3 can thus be used as those of the eyes in the system for automatically discriminating variations in the magnitudes of color differences.

The interpolation method is applied to the red (R), green (G), and blue (B) color channel responses obtained in accordance with the upper and lower limits to the subjective equivalent hue boundaries at the respective wavelengths so that regression functions can be obtained to minimize the standard deviations of these limits to the boundaries. The regression functions are given in expressions (3) through (8) as follows:

The upper limit $R_1$ to the red color channel response is given by $$R_1 = 1.05432 \times 10^{-2} X^2 + 12.6185 X - 3706.47 \qquad (3).$$

The lower limit $R_2$ to the red color channel response is given by $$R_2 = -1.47213 \times 10^{-2} X^2 + 17.494 X - 5128.92 \qquad (4).$$

The upper limit $G_1$ to the green color channel response is given by $$G_1 = -4.44467 \times 10^{-2} X^2 + 46.9235 X - 12098.6 \qquad (5).$$

The lower limit $G_2$ to the green color channel response is given by $$G_2 = -6.17325 \times 10^{-2} X^2 + 65.9239 X - 17317.7 \qquad (6).$$

The upper limit $B_2$ to the blue color channel response is give by $$B_1 = -3.33349 \times 10^{-2} X^2 + 30.2841 X - 6646.64 \qquad (7).$$

The lower limit $B_2$ to the blue color channel response is give by $$B_2 = -6.07145 \times 10^{-2} X^2 + 56.8029 X - 13066.8 \qquad (8).$$

The values of $R_1$, $R_2$, $G_1$, $G_2$, $B_1$ and $B_2$ are always positive, and the expressions (3) through (8) are valid for the wavelengths in the 410 to 670 nm range.

Figure 4:
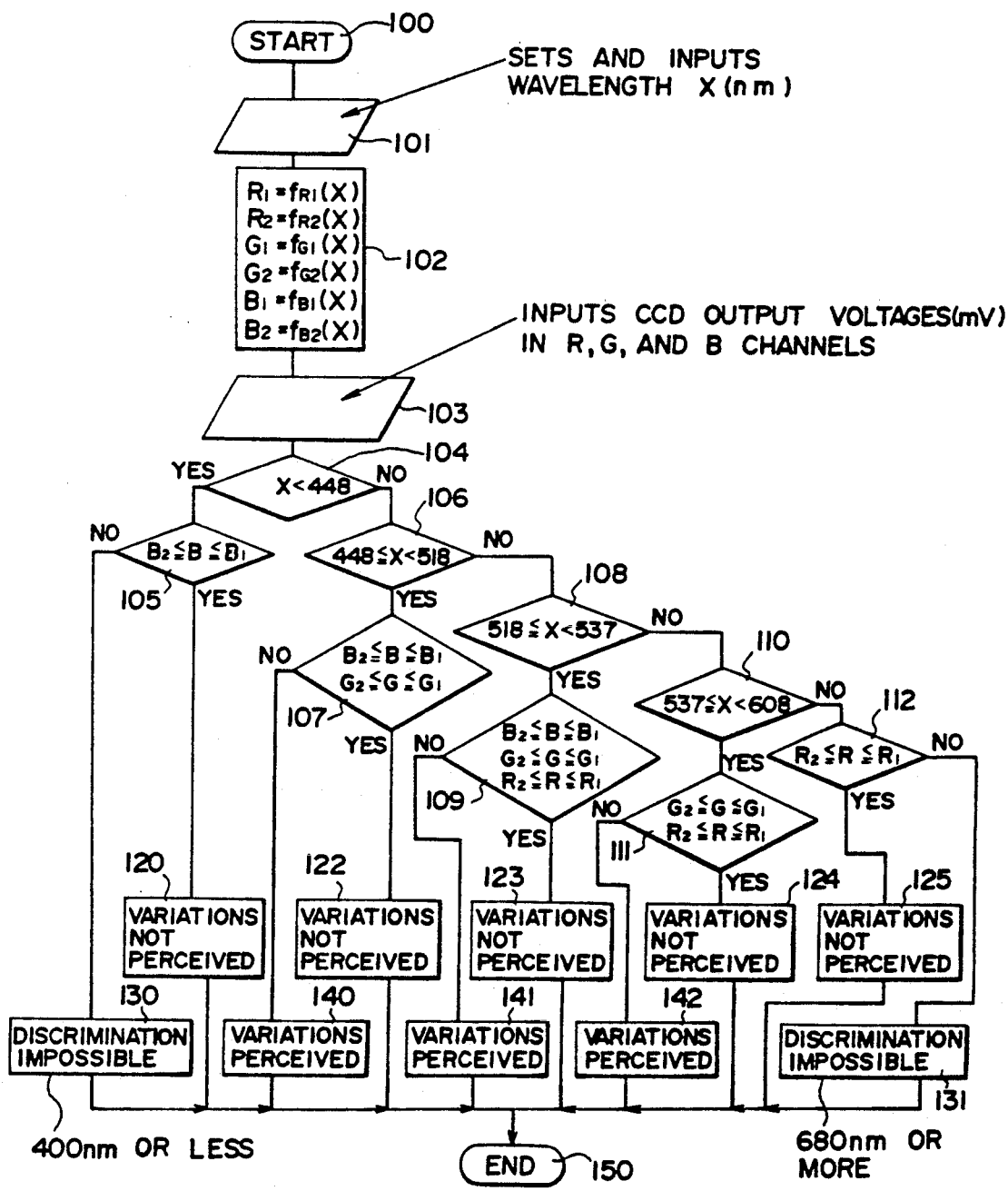
FIG. 4 shows a flowchart for discriminating the variations in the magnitudes of color differences according to the present invention.

A program was then generated to obtain the variations of magnitudes of colors in accordance with expressions (3) through (8) as shown in FIG. 4 so that the CCD imager 1 can generate an output in accordance with the color sensation of dark eyes.

The difference thresholds can be established for red ($R_1$ to $R_2$), green ($G_1$ to $G_2$), and blue ($B_1$ to $B_2$).

The boundary wavelengths, Xs, which define the thresholds for the selection of whether one or both or these two optoelectric elements are to be used in the measurement, are stored in the processor. These boundary wavelengths are $X_{448}$, $X_{518}$, $X_{537}$, and $X_{608}$ in this embodiment. The outputs of the optoelectric devices can selectively be used in accordance with these boundary wavelengths.

The operation of the device for discriminating the variations in the magnitude of color differences will be explained hereafter referring to FIGS. 3 and 4.

First, light at wavelength $X_a$ is reflected from the object to be discriminated as shown in FIG. 5(a).

Step 100

Starts the device for discriminating variations in the magnitudes of color differences. The sample 2 to be tested is then illuminated by the light source, and the supporting means becomes ready to move the optoelectric conversion device 1 (CCD imager).

Step 101

Sets the wavelengths $X_a$ (See FIG. 3).

Step 102

Inputs the numerical values defined by the following expressions at wavelength $X_a$ to the register of the 16-bit personal computer:

$$B_{1a} = B[f_{Y1}(X_a)] = f_{B1}(X_a)$$

$$B_{2a} = B[f_{Y2}(X_a)] = f_{B2}(X_a)$$

$$G_{1a} = G[f_{Y1}(X_a)] = f_{a1}(X_a)$$

$$G_{2a} = G[f_{Y2}(X_a)] = f_{a2}(X_a)$$

$$R_{1a} = R[f_{Y1}(X_a)] = f_{R1}(X_a) \text{ and,}$$

$$R_{2a} = R[f_{Y2}(X_a)] = f_{R2}(X_a).$$

In this embodiment, both $B_{1a}$ and $B_{2a}$ are to be calculated. (In each case, only necessary information is to be calculated.)

Step 103

Picks up $B_m$, $G_m$, and $R_m$ from the optoelectric conversion device 1 (CCD imager). In this embodiment, only $B_m$ is to be picked up.

Step 104

Compares the $X_a$ with the boundary wavelength $Xs = X_{448}$. Xs defines whether both of the optoelectric elements are to be used or not.

Goes to step 105 after confirming $X_a < Xs(=X_{488})$.

Step 105

Compares $B_{1a}$ and $B_{2a}$, which have been stored in step 102, with $B_m$, which has been obtained from the blue color channel CCD.

For $B_{1a} < B_m < B_{2a}$, no variations of magnitudes of color differences are to be perceived in step 120 and control ends the processing at step 150.

Unless $B_{1a} < B_m < B_{2a}$, is satisfied, variations of magnitudes of color differences are considered to be perceived. With $X_a$ is less than 400 nm, no data to be discriminated is perceived in step 130. The display device indicates the results of operations, and then the control ends the processing at step 150.

The processing to be carried out when wavelength $X_b$ ($X_b < 448$) is selected as shown in FIG. 3 will be explained below.

Step 101

Sets the wavelengths $X_b$ (See FIG. 3).

Step 102

Inputs the numerical values defined by the following expressions at wavelength $X_b$ to the register of the 16-bit personal computer.

$$B_{1b} = B[f_{Y1}(X_b)] = f_{B1}(X_b)$$

$$B_{2b} = B[f_{Y2}(X_b)] = f_{B2}(X_b)$$

$$G_{1b} = G[f_{Y1}(X_6)] = f_{a1}(X_b) \text{ and,}$$

$$G_{2b} = G[f_{Y2}(X_b)] = f_{a2}(X_b)$$

Step 103

Picks up $B_m$ and $G_m$ from the optoelectric conversion device 1 (CCD imager).

Step 104

Compares the $X_b$ with threshold wavelength $Xs = X_{448}$. Xs defines whether both of the optoelectric elements are to be used or not.

Goes to step 106 after confirming $X_b > Xs(X_{448})$.

Step 106

For $Xs(=X_{448}) \leq X_b < Xs(X_{518})$, control goes to step 107.

Step 107

For both $B_{1b} \leq B_m \leq B_{2b}$ and $G_{1b} \leq G_m \leq G_{2b}$, no variations of magnitudes of color differences are perceived, and control ends the processing step 150.

Unless the inequalities are invalid, the message of disagreement is output at step 122 and the control ends the processing at step 150.

When wavelength $X_c$ is set as shown in FIG. 3, control advances the steps in accordance with the order of steps 102, 103, 104, 106, 108, 109, 123 or 141, and 150, and then control ends the processing.

When wavelength $X_d$ is set as shown in FIG. 3, control advances the steps in accordance with the order of steps 102, 103, 104, 106, 108, 110, 111, 124 or 142, and 150, and then control ends the processing.

When wavelength Xe is set as shown in FIG. 3, control advances the steps in accordance with the order of steps 102, 103, 104, 106, 108, 110, 112, 125 or 131, and 150, and then control ends the processing.

The device for automatically discriminating variations in the magnitudes of color differences, which has been built by using a CCD imager in accordance with the present invention, automatically discriminates variations in the magnitudes of color differences, provided that the CCD imager has been assigned of color sensation of the blue eyes or dark eyes, and this type of device inherently differs from conventional detectors for detecting variations in the magnitudes of color differences.

The device build in accordance with the present invention does not rely on the experiences or sense of the operators and any differences in color sensation among the operators cannot affect the result of observation even in a case in which the operators wish to discriminate the quality of the painting of a product. If the device for discriminating variations in the magnitudes of color differences in accordance with the present invention is used in the field of production, the detection of the variations in the magnitude of the color differences can be made online. This type of device eliminates the complexity of the test process in a production line, which requires advanced technique, as well as the necessity of specialists and also will improve the quality of the products.

What is claimed is:

1. A device for discriminating variations in the magnitudes of differences in the color of an object comprising:
   (a) a light source illuminating the object;
   (b) an optoelectric conversion device receiving light reflected from said object;
   (c) means supporting said optoelectric conversion device with respect to said object; and
   (d) a processor, said processor
      (1) storing subjective equivalent hue data, said subjective equivalent hue data having an upper limit at a wavelength $Y_1 = f_{Y_1}(X)$ and a lower limit at a wavelength $Y_2 = f_{Y_2}(X)$, the wavelengths $Y_1$ and $Y_2$ being determined by the stimuli experienced by standard eyes having a specific color sensation to light reflected from said object when the object is illuminated by light having a wavelength X in the visible range;
      (2) calculating and storing functional data, said functional data being the spectral responses $B_1 = B[f_{Y_1}(X)] = f_{B_1}(X)$ and $B_2 = B[f_{Y_2}(X)] = f_{B_2}(X)$ of said optoelectric conversion device to light reflected from said object having wavelengths $Y_1$ and $Y_2$ respectively when the object is illuminated by light having a wavelength X in the visible range;
      (3) storing an output $B_m$ generated by said optoelectric conversion device when an area of said object is illuminated by said light source;
      (4) comparing $B_1$ and $B_2$ with $B_m$; and
      (5) generating an output which indicates whether or not there are variations in the magnitudes of the colors perceived.

2. The device claimed in claim 1 wherein said standard eyes having specific color sensation are dark eyes, and said subjective equivalent hue data is obtained from a person having dark eyes.

3. The device claimed in clam 1 wherein, if $B_1 < B_m < B_2$, said processor indicates that no variations in the magnitudes of color differences have been perceived.

4. The device claimed in claim 1 wherein said light source is a Xenon lamp.

5. The device claimed in claim 1 wherein said optoelectric conversion device comprises a pair of CCD imaging devices, and wherein said processor processes the outputs of said CCD imaging devices.

6. The device claimed in claim 1 wherein said supporting means moves said optoelectric conversion device in a plane which is parallel with the plane on which said object is mounted.

7. A device for discriminating variations in the magnitudes of differences in the color of an object comprising:
   (a) a light source illuminating the object;
   (b) an optoelectric conversion device receiving light reflected from said object, said optoelectric conversion device including at least first and second optoelectric elements;
   (c) means supporting said optoelectric conversion device with respect to said object; and
   (d) a processor, said processor
      (1) storing subjective equivalent hue data, said subjective equivalent hue data having an upper limit at a wavelength $Y_1 = f_{Y_1}(X)$ and a lower limit at a wavelength $Y_2 = f_{Y_2}(X)$, where the wavelengths $Y_1$ and $Y_2$ are determined by the stimuli experienced by standard eyes having a specific color sensation to light reflected rom said object when the object is illuminated by light having a wavelength X in the visible range;
      (2) calculating and storing functional data, said functional data being the spectral responses $B_1 = B[f_{Y_1}(X)] = f_{B_1}(X)$ and $B_2 = B[f_{Y_2}(X)] = f_{B_2}(X)$ of said first optoelectric element and $G_1 = [f_{Y_1}(X)] = f_{G_1}(X)$ and $G_2 = G[f_{Y_2}(X)] = f_{G_2}(X)$ of said second optoelectric element respectively to light reflected from said object having wavelengths $Y_1$ and $Y_2$ when the object is illuminated by light having a wavelength X in the visible range;
      (3) storing boundary wavelengths $X_s$, said boundary wavelengths defining the boundary between the spectral responses of said first and second optoelectric elements;
      (4) comparing X with $X_s$ to determine whether said first, second or both optoelectric elements are to be used in a measurement;
      (5) storing outputs $B_m$ and $G_m$ generated by said first and second optoelectric elements respectively when an area of said object is illuminated by said light source;
      (6) comparing $B_1$ and $B_2$ with $B_m$ and/or $G_1$ and $G_2$ with $G_m$ depending on the result of comparing X with $X_s$; and
      (7) generating an output which indicates whether or not there are variations in the magnitudes of the colors perceived.

8. The device claimed in claim 7 wherein, if $B_1 < B_m < B_2$ and $G_1 < G_m < G_2$, said processor indicates that no variations in the magnitudes of color differences have been perceived; and wherein said processor indicates the result on a display.

* * * * *